(12) United States Patent
Hebert et al.

(10) Patent No.: US 11,077,748 B2
(45) Date of Patent: Aug. 3, 2021

(54) LIQUID RESERVOIR SHUTOFF VENT

(71) Applicant: Donaldson Company, Inc., Minneapolis, MN (US)

(72) Inventors: Michael J. Hebert, St. Paul, MN (US); Alexandra M. Boyat, Minneapolis, MN (US); Daniel Dotzler, Webster, MN (US); Joseph M. Block, Carver, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 16/077,948

(22) PCT Filed: Feb. 17, 2017

(86) PCT No.: PCT/US2017/018296
§ 371 (c)(1),
(2) Date: Aug. 14, 2018

(87) PCT Pub. No.: WO2017/147004
PCT Pub. Date: Aug. 31, 2017

(65) Prior Publication Data
US 2019/0054821 A1 Feb. 21, 2019

Related U.S. Application Data

(60) Provisional application No. 62/299,959, filed on Feb. 25, 2016.

(51) Int. Cl.
*B60K 15/035* (2006.01)
*F16K 24/00* (2006.01)
*F16K 17/28* (2006.01)

(52) U.S. Cl.
CPC ...... *B60K 15/03519* (2013.01); *B60K 15/035* (2013.01); *F16K 17/28* (2013.01);
(Continued)

(58) Field of Classification Search
CPC ............ B60K 15/03519; B60K 15/035; B60K 2015/03576; B60K 2015/03561; B60K 2015/03552; F16K 24/00; F16K 17/28
(Continued)

(56) References Cited

U.S. PATENT DOCUMENTS

| 1,329,559 A | 2/1920 | Tesla |
| 2,165,839 A | 7/1939 | Davis |

(Continued)

FOREIGN PATENT DOCUMENTS

| DE | 102014010728 A1 | 11/2015 |
| DE | 102014011140 A1 | 11/2015 |

(Continued)

OTHER PUBLICATIONS

International Patent Application No. PCT/US2017/018296 filed Feb. 17, 2017, International Preliminary Report on Patentability dated Sep. 7, 2018; 6 pages.

(Continued)

*Primary Examiner* — John Bastianelli
(74) *Attorney, Agent, or Firm* — Mueting Raasch Group

(57) ABSTRACT

A shutoff vent is disclosed. A main body has a first end and a second end. The main body defines a first opening towards the first end, a second opening towards the second end, and a mating port between the first opening and the second opening. The first opening and the second opening are in communication through the mating port to define a gas passageway. A translatable plug is disposed within the main body, and the gas passageway extends past the translatable plug. The translatable plug is configured to reversibly translate towards the second end and to sealably obstruct the mating port. In some examples, the translatable plug is configured to translate towards the second end when force is applied to the translatable plug from the first end.

14 Claims, 13 Drawing Sheets

(52) U.S. Cl.
CPC .... *F16K 24/00* (2013.01); *B60K 2015/03552* (2013.01); *B60K 2015/03561* (2013.01); *B60K 2015/03576* (2013.01)

(58) Field of Classification Search
USPC .................. 251/331, 335.2, 129.22, 129.17
See application file for complete search history.

(56) References Cited

U.S. PATENT DOCUMENTS

| | | | |
|---|---|---|---|
| 2,659,152 A | 11/1953 | Hieger | |
| 2,675,823 A | 4/1954 | Langdon | |
| 2,902,045 A | 9/1959 | Lunn | |
| 2,922,614 A * | 1/1960 | Nickells | F16K 31/0689 251/54 |
| 3,059,661 A | 10/1962 | Benmore | |
| 5,036,823 A * | 8/1991 | MacKinnon | F02D 33/006 123/520 |
| 5,070,899 A * | 12/1991 | Matkovich | A61M 39/24 137/455 |
| 5,313,978 A | 5/1994 | Takaki et al. | |
| 5,327,934 A | 7/1994 | Thompson | |
| 5,404,907 A | 4/1995 | Benjey et al. | |
| 5,522,769 A * | 6/1996 | DeGuiseppi | F16H 57/027 454/270 |
| 5,577,526 A | 11/1996 | Kasugai et al. | |
| 6,076,803 A * | 6/2000 | Johnson | F16K 31/0651 251/129.22 |
| 6,481,592 B2 | 11/2002 | Harris | |
| 6,508,263 B1 | 1/2003 | Jahnke et al. | |
| 6,810,862 B2 | 11/2004 | Bergsma | |
| 6,874,484 B2 * | 4/2005 | Benjey | B60K 15/03519 123/520 |
| 6,895,943 B1 | 5/2005 | Taxon | |
| 8,178,023 B2 | 5/2012 | Ikeyama | |
| 8,272,398 B2 | 9/2012 | Erdmann | |
| 8,485,214 B2 | 7/2013 | Erdmann et al. | |
| 8,777,051 B2 | 7/2014 | Whelan | |
| 2005/0139077 A1 | 6/2005 | Garikipati et al. | |
| 2007/0101974 A1 | 5/2007 | Achor | |
| 2009/0065436 A1 | 3/2009 | Kalayci et al. | |
| 2010/0236633 A1 * | 9/2010 | Esparza | E21B 41/0078 137/13 |
| 2011/0005614 A1 | 1/2011 | Pifer et al. | |
| 2011/0088662 A1 | 4/2011 | Erdmann | |
| 2011/0192844 A1 * | 8/2011 | Erdmann | B60K 15/04 220/86.2 |
| 2012/0006839 A1 * | 1/2012 | Shears | B60K 15/03519 220/745 |
| 2013/0284675 A1 | 10/2013 | Core | |
| 2014/0290628 A1 * | 10/2014 | Mills | F02M 25/08 123/518 |
| 2015/0053704 A1 * | 2/2015 | Hill | B60K 15/03519 220/746 |
| 2016/0290476 A1 * | 10/2016 | Balsiger | F16K 24/00 |

FOREIGN PATENT DOCUMENTS

| | | |
|---|---|---|
| EP | 1 221 566 B1 | 3/2004 |
| EP | 2196347 A1 | 6/2010 |

OTHER PUBLICATIONS

International Patent Application No. PCT/US2017/018296 filed Feb. 17, 2017, International Search Report / Written Opinion dated Apr. 24, 2017; 8 pages.

* cited by examiner

LIQUID RESERVOIR SHUTOFF VENT

This application is the § 371 U.S. National Stage of PCT International Patent application filed Feb. 17, 2017, in the name of Donaldson Company, Inc., a U.S. national corporation, applicant for the designation of all countries and Michael J. Hebert, a U.S. Citizen, Alexandra M. Boyat, a U.S. Citizen, Daniel Dotzler, a U.S. Citizen, and Joseph Block, a U.S. Citizen, inventors for the designation of all countries, which claims priority to U.S. Provisional Patent Application No. 62/299,959, filed Feb. 25, 2016, the contents of which are herein incorporated by reference in their entirety.

FIELD OF THE TECHNOLOGY

Background

Vehicular liquid reservoirs require venting to maintain ambient pressure as liquid, such as fuel or urea, is added or removed and vapors/gases expand or contract due to temperature changes. Such venting allows fuel vapors and air to flow both in to and out of the reservoir. Venting can desirably provide rollover protection to prevent liquid from exiting the reservoir through the vent if the vehicle is upset. Attempts have been made to provide a vent that provides both adequate venting and rollover protection. In some vents, for example, mechanisms have been employed that allow venting in only one direction. Some other vents are constructed of relatively durable materials such as steel, which leave a large footprint, are relatively expensive to manufacture, and leave the vehicle reservoir open to the environment. Yet other vents have been constructed with a gas-permeable membrane that allows gaseous venting but prevents liquid from flowing through the membrane. However, many membrane-only devices provide insufficient rollover protection and are susceptible to plugging upon contact with the reservoir liquid, leading to inadequate venting.

BRIEF DESCRIPTION OF THE DRAWINGS

The presently-described technology may be more completely understood and appreciated in consideration of the following detailed description of various embodiments in connection with the accompanying drawings.

DETAILED DESCRIPTION

Described herein are various shutoff vents for use with liquid reservoirs. "Liquid reservoir" as used herein shall refer to any vessel for containing a liquid. In a variety of embodiments, the liquid reservoir is present onboard a vehicle, although this disclosure is not limited to that specific implementation. The term "gas" as used herein shall refer to vapors and any other gaseous matter.

Figure 3:
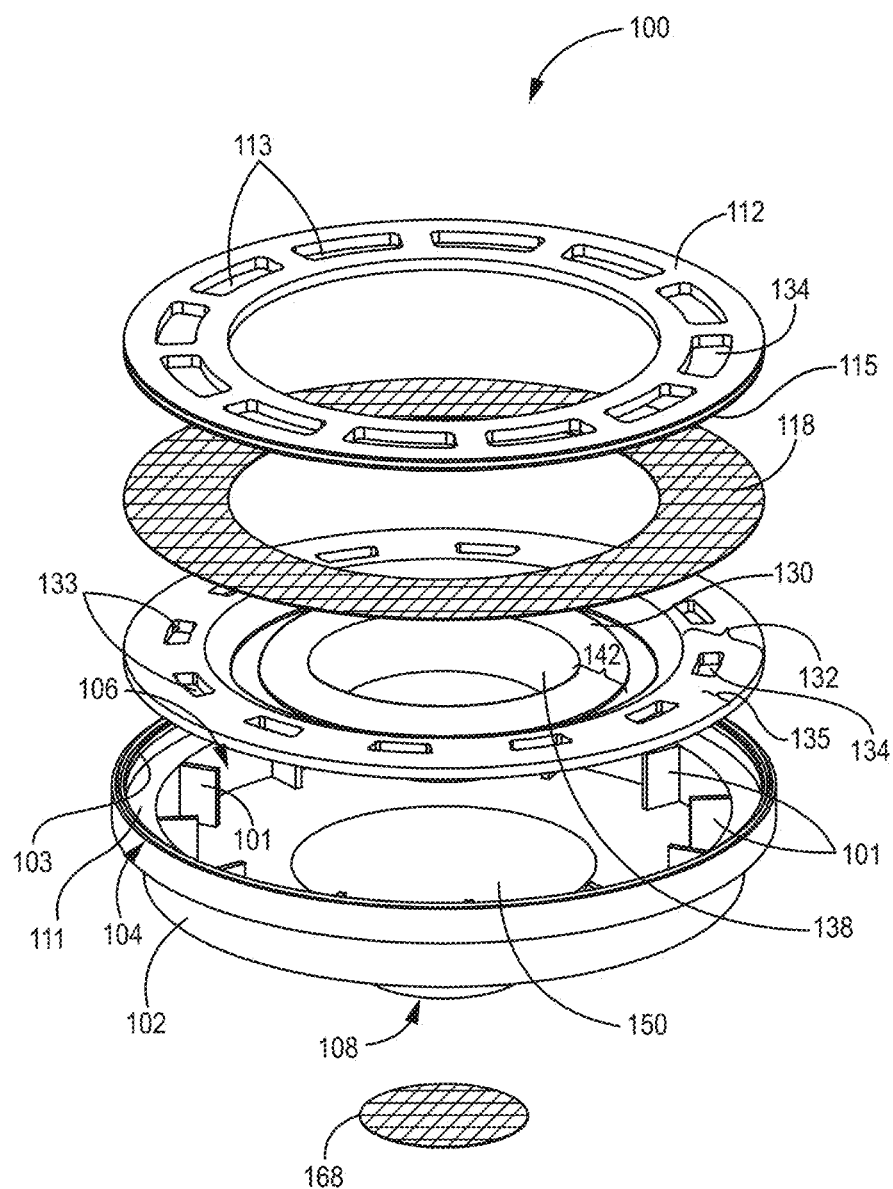
FIG. 3 is a bottom perspective exploded view of the example shutoff vent of FIG. 1.
Figure 4:
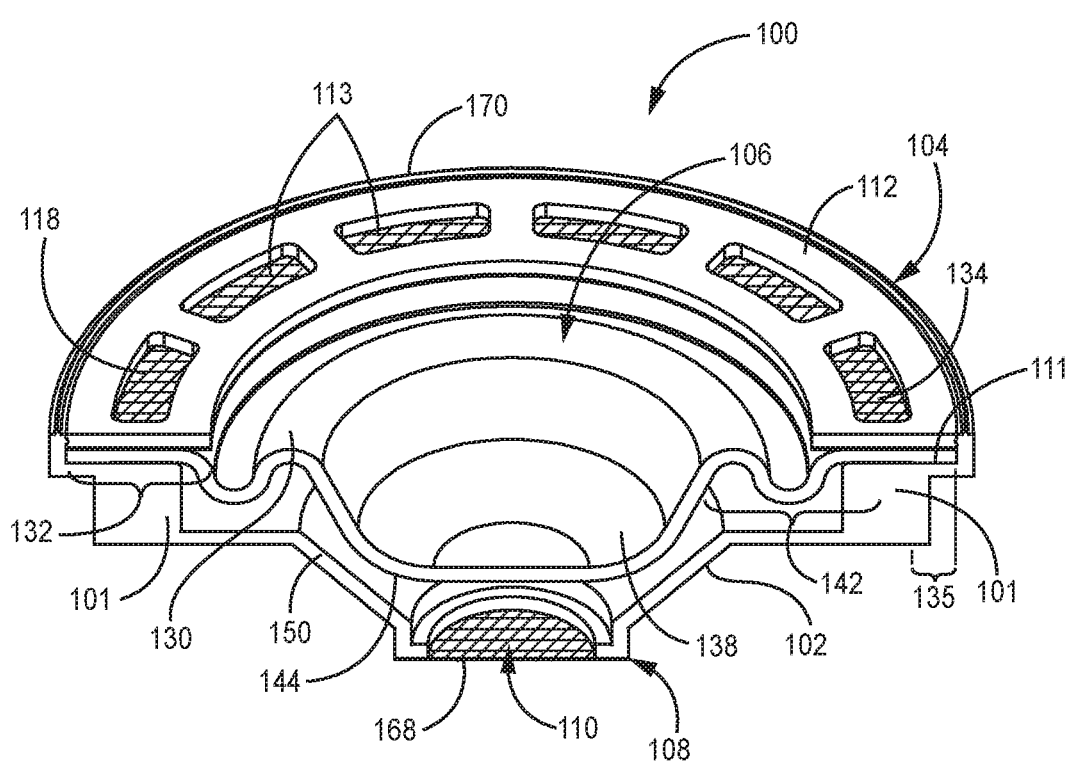
FIG. 4 is cross sectional bottom perspective view of shutoff vent of FIG. 1.

In various embodiments, the current technology relates to a reservoir vent that provides shutoff performance. FIGS. 1-5 illustrate an example shutoff vent 100 consistent with the various embodiments of the technology disclosed herein, which can be referenced within the following description. Referring in particular to FIG. 4, the shutoff vent 100 generally has a main body 102 with a first end 104 and a second end 108. The main body 102 defines a first opening 106 towards the first end 104 and a second opening 110 towards the second end 108. The main body 102 defines a mating port 150 between the first opening 106 and the second opening 110. In an open vent position, the first opening 106 and the second opening 110 are in fluid communication through the mating port 150 to define a gas passageway 134.

Figure 1:
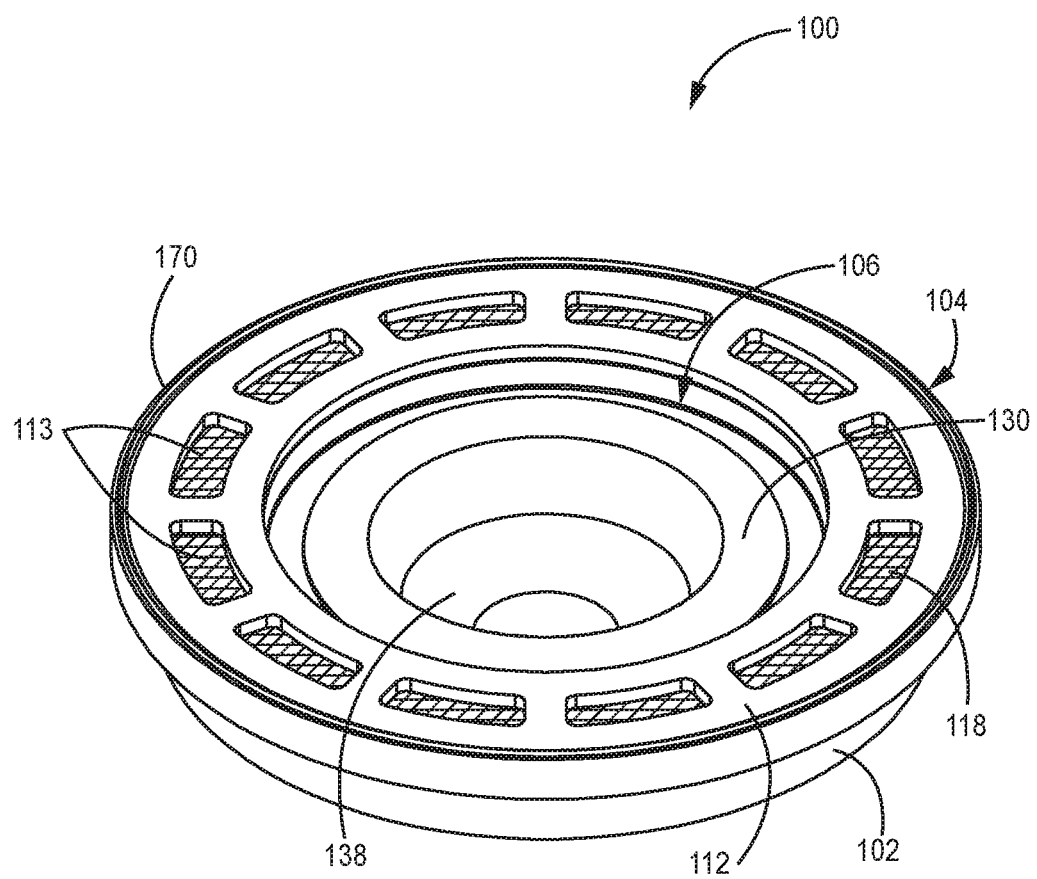
FIG. 1 is a bottom perspective view of a shutoff vent consistent with the technology disclosed herein.

Referring for a moment to FIG. 1, the vent 100 defines a coupling structure 170 configured to couple to a liquid reservoir. In some embodiments the coupling structure 170 is configured to couple to a liquid reservoir cap. In this particular embodiment, the main body 102 defines a coupling structure 170 that is a perimetric ridge configured for insertion into a mating receptacle defined by the liquid reservoir, the liquid reservoir cap, or intermediate component between the vent 100 and the reservoir or the liquid reservoir cap. The vent 100 can alternatively, or additionally, be secured to the reservoir or reservoir cap by an adhesive, through over-molding, or by heat welds, ultrasonic welds, or other types of welds. Other types of coupling structures can be employed to secure a vent to a liquid reservoir or liquid reservoir cap, such as threads, snap fits, press fits, and the like. Generally, the first end 104 is configured to mount in a position above the maximum liquid level of the liquid reservoir when the reservoir is in an upright (non-upset) orientation.

The vent 100 has a selectively translatable plug 138 disposed within the main body 102. The translatable plug 138 is generally defined by one or more structures that are configured to form a seal with the main body 102 to obstruct the gas passageway 134 when force is applied to the plug 138 from the first end 104. The plug 138 is configured to block fluid communication in the gas passageway 134 between the first opening 106 and the second opening 110 by sealably obstructing the mating port 150, thereby preventing liquid from flowing through the vent 100. The plug 138 is configured to reversibly translate towards the second end 108 when a minimum force is applied to the translatable plug 138 from the first end 104. The plug 138 is configured to translate to the extent that it sealably obstructs the mating port 150. In some embodiments, the plug 138 of the vent 100 is configured to allow no more than 2-6 cm$^3$ of fluid per minute at 1.25 kPa to pass through the first opening 106 from the second opening 110. In some embodiments, the plug 138 of the vent 100 is configured to allow no more than 3 cm$^3$ of fluid per minute at 1.25 kPa to pass through the first opening 106 from the second opening 110. The vent 100 also has a first gas-permeable substrate 118.

In many embodiments, the first opening 106 of the vent 100 is in communication with the interior of a liquid reservoir. In a vehicular liquid reservoir, for example, an upset vehicle condition may result in reservoir liquid entering the vent 100 through the first opening 106. The liquid will flow against the first side of the plug 138 and, in this particular example, the carrier 130. The resulting hydrostatic pressure will apply a net force to the plug 138 and carrier 130 in a direction towards the second end 108. This force can translate the plug 138 towards the second end 108 as the carrier 130 deflects. In other conditions, erratic vehicle operation or a vehicular collision may cause the liquid in a reservoir to slosh. The sloshing liquid impinging on the vent 100 from the first end 104 will apply force to the plug 138, and in this example, to the carrier 130, which causes deflection of the carrier 130 and translation of the plug 138 towards the second end 108. Sufficient force applied to the plug 138, and in this example the carrier 130, accommodates translation of the plug 138 to sealably obstruct the mating port 150.

The first gas-permeable substrate 118 generally allows gaseous communication and generally discourages liquid flow there-through, particularly the liquid contained in a reservoir. In some embodiments, the first gas-permeable substrate 118 is generally impermeable to the liquid the first substrate 118 is configured to contain in the reservoir. In some other embodiments, the first substrate 118 is configured to provide splash protection by discouraging liquid from entering the vent 100. In some embodiments, the first substrate 118 is repellant to liquids it is configured to contain in the reservoir. In some embodiments, the first substrate 118 is resistant to plugging up or fouling in the presence of the liquid that the vent 100 is configured to contain, as the first substrate 118 may be contacted by the reservoir liquid during normal vehicle operation. In some embodiments, the first substrate 118 is configured to maintain its gas permeability when wetted with the relevant liquid. Generally, the first gas-permeable substrate 118 is configured to be chemically stable in the presence of the liquid that the first substrate 118 is configured to contain in a reservoir.

In some embodiments, the vent 100 can incorporate a first substrate 118 that repels liquid hydrocarbons. The first substrate 118 can have hydrophobic properties in some embodiments. In a number of embodiments the first gas-permeable substrate 118 is oleophobic. In some examples, the first substrate 118 is chemically stable in the presence of hydrocarbons such as gasoline. In some examples, the first substrate 118 is substantially impermeable to liquid hydrocarbons such as gasoline at least when the liquid hydrocarbon makes passive contact with the first gas-permeable substrate 118, meaning that the liquid hydrocarbon exerts relatively low pressure on the first gas-permeable substrate, such as when the liquid hydrocarbon splashes on the first gas-permeable substrate 118. In some embodiments, the first substrate 118 is chemically stable in the presence of urea. In such examples, the first substrate 118 is substantially impermeable to liquid urea at least when the urea makes passive contact with the first gas-permeable substrate 118. The first gas-permeable substrate can have combinations of the above properties. For example, the first gas-permeable substrate 118 can be hydrophobic and oleophobic, or, in another example hydrophobic, oleophobic, and chemically stable in the presence of urea and/or hydrocarbon fluids.

The materials used to construct the first substrate 118 can possess the liquid-repellant properties. Alternatively or additionally, the first substrate 118 can have a coating to impart the liquid repellency properties. In some embodiments, the first substrate 118 has a membrane. In some embodiments, the first substrate 118 has a scrim. In some embodiments, the first substrate 118 has a breathable film such as a perforated film, porous film or microporous film. In the various embodiments consistent with the technology disclosed herein, the first substrate 118 can include any combination of at least one of the group of membrane, film, and scrim. In some embodiments, a scrim is used to support a membrane. In some embodiments, the first gas-permeable substrate 118 is constructed of one or more polymeric materials. The first gas-permeable substrate 118 can be constructed of expanded polytetrafluoroethylene (ePTFE). The first substrate 118 can have an ePTFE membrane. Other materials suitable for use in the first substrate 118 include polyethylene terephthalate (PET), polyethylene (PE), polyethersulfone (PES), acrylic, and other polymers. In some embodiments, the first substrate 118 has a polymeric woven or nonwoven scrim. In some embodiments, the first substrate 118 has a polymeric mesh. In other embodiments, the first substrate 118 has a metallic mesh. In such embodiments, the scrim of the first substrate 118 can be constructed of stainless steel, for example. A polymeric or metal mesh can be a woven mesh or a cast mesh.

The first gas-permeable substrate 118 can be disposed around the plug 138. The first gas-permeable substrate 118 generally extends between the plug 138 and the main body 102 of the vent 100. In some embodiments, including the one depicted, the first gas-permeable substrate 118 is disposed between the first opening 106 and the second opening 110. In such embodiments, the first gas-permeable substrate 118 and the plug 138 form a liquid barrier between the first opening 106 and the second opening 110 of the main body 102.

Figure 2:
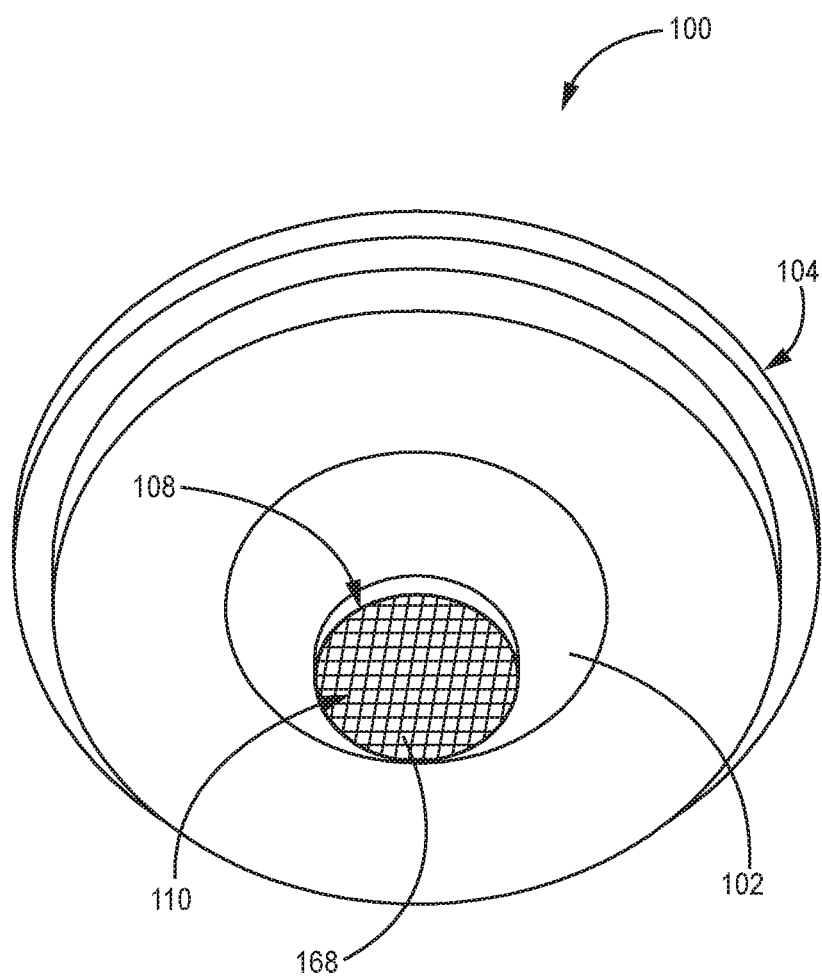
FIG. 2 is a top perspective view of the example shutoff vent of FIG. 1.

FIG. 2 shows a top perspective view of the shutoff vent 100. A second gas-permeable substrate 168 is disposed across the second opening 110 towards the second end 108 of the main body 102. In some example implementations of the current technology, the second opening 110 is in communication with a venting system. In some implementations, such as vehicular diesel exhaust fluid (DEF) reservoirs, liquid fuel reservoirs, urea reservoirs, oil reservoirs, windshield washing fluid reservoirs, or marine fuel reservoirs, the second opening 110 is in communication with the ambient environment. In other examples, such as automotive fuel reservoirs, the second opening 110 is in communication with a vapor collection system. The second gas-permeable substrate 168 can provide ingress protection from liquid and solid contaminants. Such contaminants could prevent the plug 138 from sealing with the mating port 150 and inhibit shutoff performance in an upset liquid reservoir condition. The term "upset" as used herein refers to any attitude or orientation of a reservoir that exceeds that which is experienced during normal operation. Specifically, it refers to any attitude or orientation that causes the location of the shutoff vent to become submerged. The second gas-permeable substrate 168 can be used between the vent and the ambient environment to prevent the ingress of aerosols and other potential contaminants. The second gas-permeable substrate 168 may or may not be incorporated in vents for reservoirs that are vented to containment systems or environments isolated from the ambient. As such, in a variety of embodiments otherwise consistent with FIGS. 1-5, the second gas-permeable substrate 168 can be omitted.

The shutoff vent 100 can have a carrier 130 disposed across the first opening 106. FIG. 3 is an exploded view of the shutoff vent 100. Generally, the carrier 130 carries the plug 138. In a variety of embodiments the carrier 130 translatably carries the plug 138. In some embodiments, the carrier 130 biases the plug 138 away from the mating port 150 to allow fluid communication through the mating port 150 to further define the gas passageway 134. The carrier 130 can, in some embodiments, cooperate with the plug to form a liquid barrier between the first and second openings 106 and 110 of the main body 102. The carrier 130 is disposed across the first opening 106, and defines a perimeter region 132. The translatable plug 138 is generally coupled to the carrier 130. The carrier 130 can be overmolded to the plug 138 to form an integral component. The plug 138 can be welded to the carrier 130, or otherwise adhered using adhesives and the like. The plug 138 can also be integral to the carrier 130 such that a single molded component defines both the carrier 130 and the plug 138. The plug 138 can be coupled to the carrier 130 such that it is in a region central to the perimeter region 132. In this particular example, the plug 138 is radially symmetrical and is concentric with the carrier 130.

In some embodiments, the carrier 130 is substantially liquid impermeable. In some embodiments, the carrier 130 is substantially gas impermeable. In a variety of embodiments, carrier 130 is substantially liquid and gas impermeable. In this particular example, the carrier 130 is substantially liquid and gas impermeable. The carrier 130 can be a single molded component. In such cases, the carrier 130 is constructed of a substantially liquid and gas impermeable material. In some embodiments, the carrier 130 can be coated with a substantially liquid and gas impermeable material. The carrier 130 is generally polymeric in embodiments consistent with FIGS. 1-5. In some embodiments, certain polymeric materials are suitable for use as a carrier because they are characterized by chemical stability in the presence of particular liquids. Such liquids with which the carrier 130 may interact with gasoline, diesel, other hydrocarbons and forms of liquid fuel, DEF (including urea and water), water, ethylene glycol, methylated spirits, ethanol, isopropanol, and other liquids commonly present onboard a vehicle. The carrier can be constructed of an elastomer. In some examples, and carrier can be constructed of a thermoplastic elastomer such as Santoprene™ from ExxonMobil in Irving, Tex., a rubber such as EPDM, or silicone.

Generally, liquid impermeability of the carrier 130 can be desirable to prevent liquids from passing through the vent. Because the material of the carrier 130 in this example is substantially gas impermeable, the carrier defines a gas passageway 134 to allow gas to flow between the first end 104 to the second end 108 of the vent 100. The gas passageway 134 is further defined by a plurality of carrier openings 133 in the perimeter region 132 of the carrier 130. In this example, the carrier openings 133 are radially symmetrically positioned around the perimeter region 132, although alternative configurations are contemplated. As such, the gas passageway 134 extends past the translatable plug 138.

The carrier 130 allows the plug 138 to reversibly translate. At least a portion of the carrier 130 is configured to deflect towards the second end 108 of the main body 102 when force is applied to the plug 138 from the first end 104. In some examples, at least a portion of the carrier 130 is also configured to translate towards the second end 108 when force is applied to the carrier 130 from the first end 104.

In the current embodiment, the carrier 130 defines a diaphragm spider region 142 configured to accommodate translation of the plug 138. The spider region 142 is defined by an undulating section of material spanning the gap between the perimeter region 132 and the plug 138. In some examples, the spider region 142 has a generally s-shaped cross section. The plug 138 is suspended by the spider region 142. Plug 138 translation is facilitated by the spider region 142. The spider region 142 contains excess material so that relatively less pressure is required to translate the plug 138 towards the second end 108 compared to a design lacking a spider region. The stiffness of the spider region 142 can be tuned by varying the amount of excess material carried by the undulations, varying the type of material, varying the thickness of the material, and the like. The stiffness of the spider region 142 can be configured such that the plug 138 sealably obstructs the mating port 150 upon application of a minimum amount of force on the plug from the first end 104 of the vent 100. The stiffness of the spider region 142 can be configured such that the carrier 130 biases the plug 138 away from the mating port 150 and towards the second end 108 of the vent 100 so that the mating port 150 is not obstructed by the plug 138 by the pressure differential caused by gaseous outflow from the first end of the vent to the second end. Proper stiffness can also result in predictable shutoff performance. The hydrostatic pressure exerted on the components of a vent during an upset condition are highly variable and dependent on factors such as the attitude of the reservoir, the amount of liquid in the reservoir, and the density of the liquid. In some embodiments, the shutoff vent provides shutoff performance even if relatively low hydrostatic pressure is exerted.

In the example embodiments of FIGS. 1-5, the plug 138 is integral to the carrier 130. The plug 138 could alternatively be a separate component that is securably coupled to the carrier 130 by welds, adhesive, and the like. The plug 138 is generally constructed of a material exhibiting chemical stability in the presence of the liquids that the vent 100 is configured to contain. Many polymers, such as those discussed above found suitable for use as the carrier 130, may be used to construct the plug 138. The plug 138 can be an elastomer. The plug 138 can be a thermoplastic elastomer. In a variety of embodiments, the plug 138 can be constructed of a flexible material such as Santoprene™ from ExxonMobil in Irving, Tex., a rubber such as EPDM, or silicone. A flexible plug can conform to the surface of the mating port to facilitate sealing even in a slightly misaligned configuration.

In the examples shown in FIGS. 1-5, vent 100 the components are generally radial. The mating port 150 defines a frustoconical surface. The frustoconical shape of the mating port 150 and the circular, radially symmetrical shape of the plug 138 facilitate the forming of a seal between the plug mating surface 144 and the mating port 150. The mating surface 144 is tapered from the second end 108 to the first end 104. The plug 138 can translate towards the mating port 150 in a relatively misaligned manner resulting from uneven forces applied to the plug 138. The frustoconical walls of the mating port 150 can guide the tapered or rounded mating surface 144 of the plug 138 into a relatively aligned position to form a seal. The tapered shape of the mating surface 144 accommodates a seal with the mating port 150 in a misaligned position.

Figure 5:
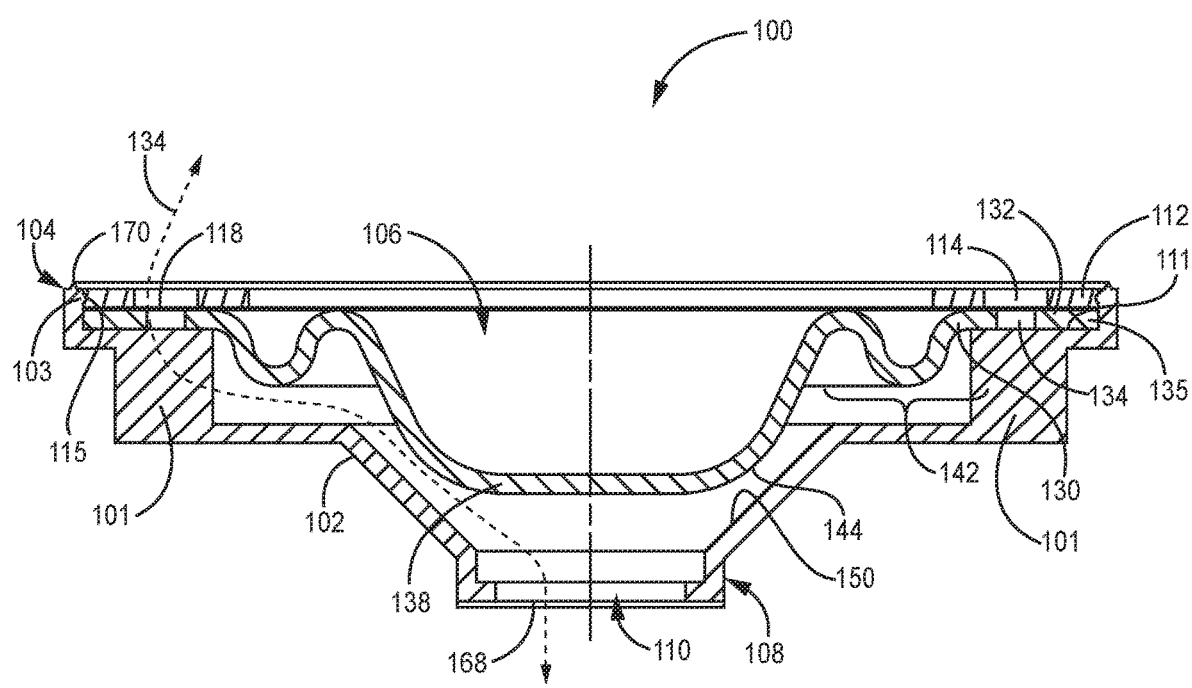
FIG. 5 is a cross sectional side view of the shutoff vent of FIG. 1.

As shown by FIGS. 3-5, the main body 102 defines a lip 111 configured to receive an outer perimeter 135 of the carrier 130. The carrier 130 is seated on the lip 111 and is generally in sealable engagement. In some embodiments, the carrier 130 is hermetically sealed to the main body 102. The gas passageway 134 between the first opening 106 and the second opening 110 is further defined by the carrier 130. In the current embodiment, the main body 102 of the vent 100 defines support ribs 101 extending radially inward from the lip 111 of the main body 102. The support ribs 101 are positioned incrementally. A support surface of each support rib 101 can be coplanar with the lip 111. The support ribs 101 are generally configured to provide support to the carrier 130 and, potentially, the first gas-permeable substrate 118. The support ribs 101 are generally configured to hinder unseating of the carrier 130 from the lip 111 when the translatable plug 138 and the carrier 130 are subjected to relatively significant force from the first end 104. Some embodiments can omit support ribs, and in some embodiments the support ribs can have a different configuration. For example, the support ribs can have a slightly different slope than the lip 111 or be offset from the lip 111.

The first gas-permeable substrate 118 is disposed across the perimeter region 132 of the carrier 130. The vent 100 has a retaining ring 112. The retaining ring 112 is configured to retain the first gas-permeable substrate 118 and the carrier 130 in position relative to the main body 102. The retaining ring 112 is disposed adjacent to the first gas-permeable substrate 118. The first substrate 118 is sandwiched between the ring 112 and the carrier 130. The retaining ring 112 defines the gas passageway 134 through a plurality of first openings 113. The first openings 113 at least partially overlap with the carrier openings 133 of the carrier 130 to further define the gas passageway 134, such that there is fluid communication between the first opening 106 and the second opening 110 of the vent 100 past the translatable plug 138.

The retaining ring 112 can be configured to retain the first substrate 118 and the carrier 130 by compressing the first substrate 118 and the carrier 130 against the lip 111 of the main body 102. In this example, the retaining ring 112 defines a perimetric groove 115 configured to interface with a mating ridge 103 defined by the first end 104 of the main body 102. Such a ridge and groove or other similar structures can form a snap or interference fit. Other means of coupling the retaining ring 112 with the main body 102 can be employed. For example, the ring 112 can be welded to the main body 102 or attached with an adhesive. In the alternative or in addition, the first substrate 118 can be welded or adhered to the retaining ring 112. In other embodiments, the first substrate 118 is not fixed to the retaining ring 112. In various embodiments, the carrier 130 can be welded or adhered to the substrate. In other embodiments, the carrier 130 is not fixed to the first substrate 118. In some embodiments, the carrier 130 can be welded or adhered to the main body 102. In other embodiments, the carrier 130 is not welded or adhered to the main body 102. The ring 112, the carrier 130, and the first substrate 118 can be integrated with the main body 102 in an overmolding process during the manufacture of the main body 102. Many ways of attaching the ring 112, the first substrate 118, the carrier 130, and the main body 102 are contemplated.

It is noted that the main body 102, the retaining ring 112, the first and second gas-permeable substrates 118 and 168, the carrier 130, the plug 138, and any other components that are in communication with the interior of a liquid reservoir are generally constructed to be chemically stable in the presence of the liquid contained in the reservoir. Many examples described herein describe the use of polymeric materials, but other materials are contemplated that provide similar performance.

Figure 6:
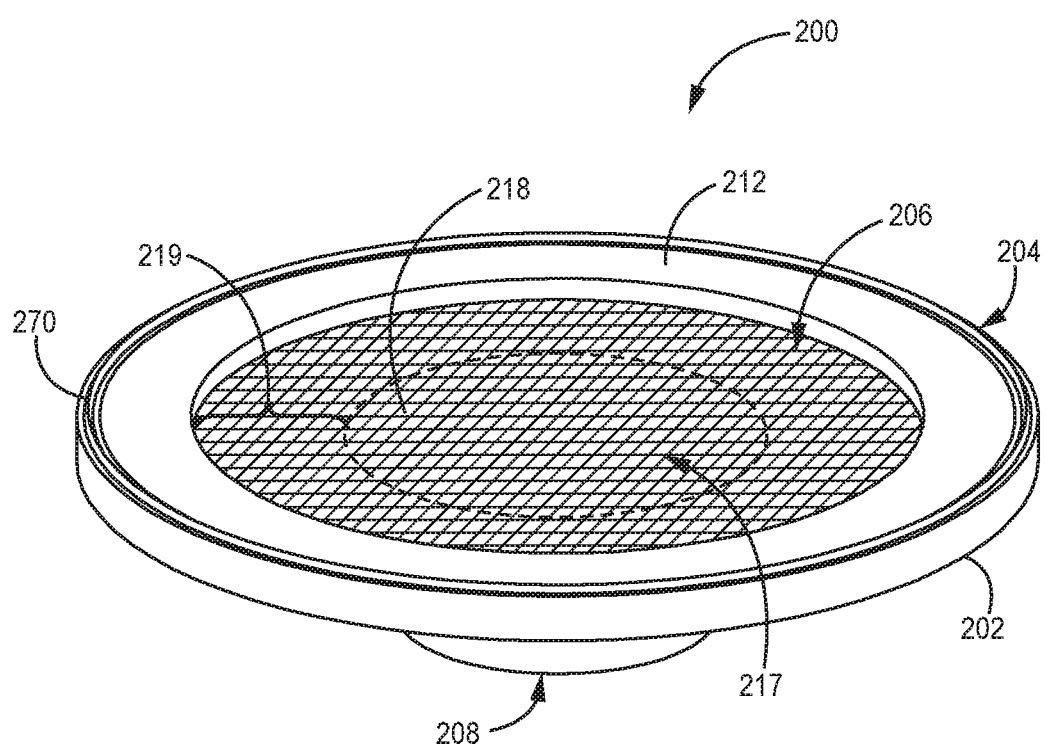
FIG. 6 depicts a bottom perspective view of another example embodiment consistent with the technology disclosed herein.
Figure 7:
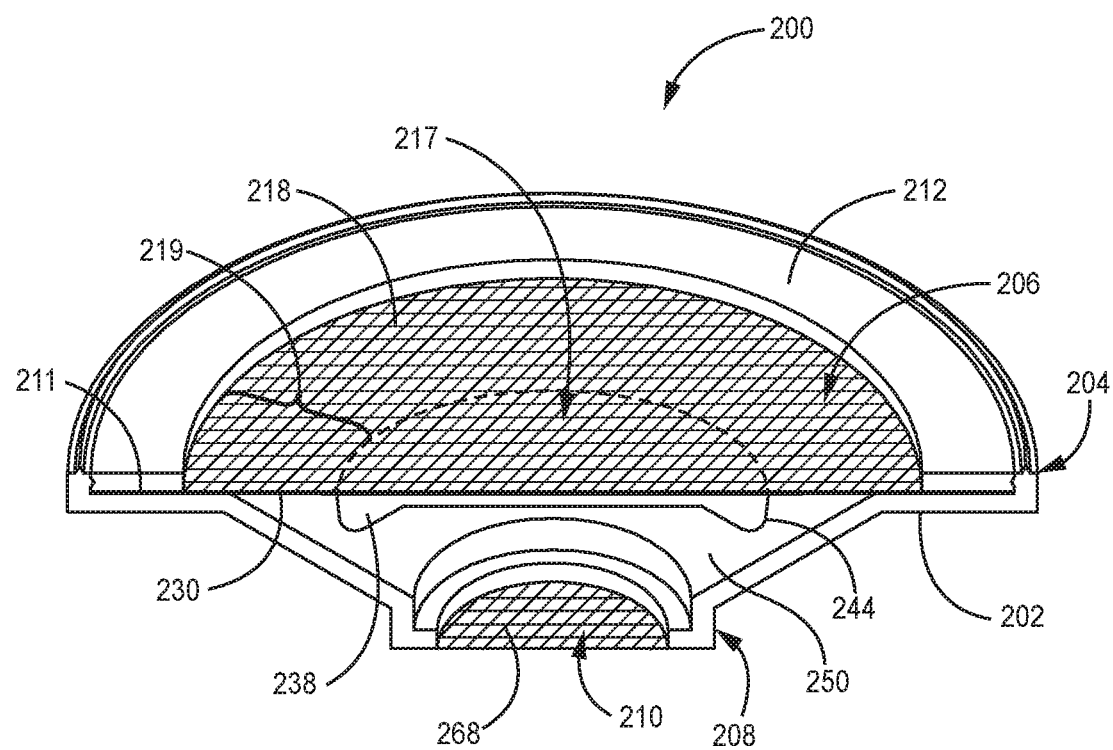
FIG. 7 is a cross sectional bottom perspective view of the vent of FIG. 6.
Figure 8:
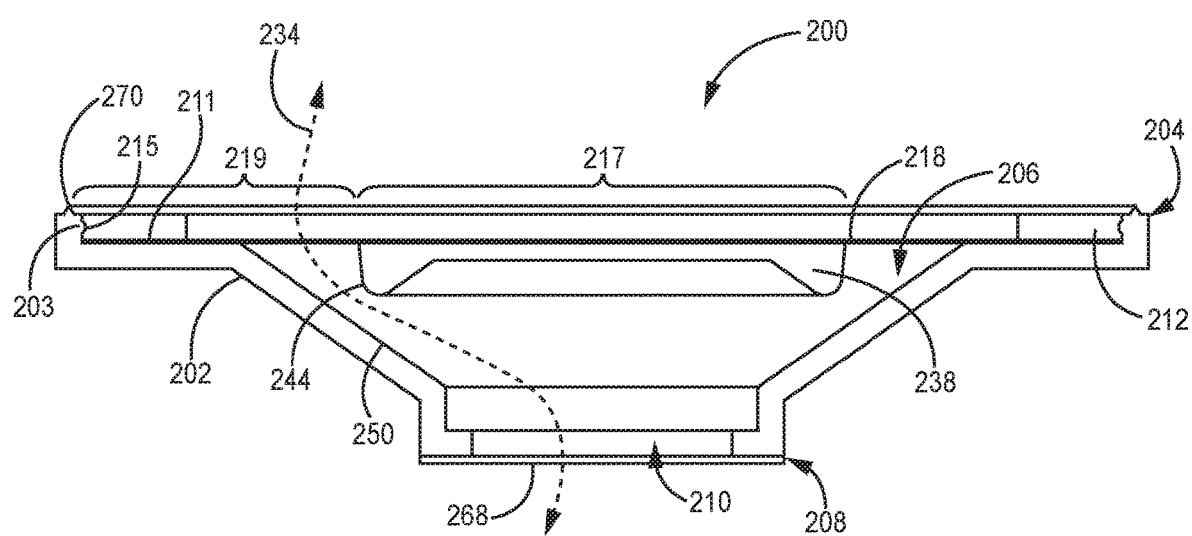
FIG. 8 is a cross sectional side view of the shutoff vent of FIG. 6.

Turning now to FIGS. 6-8, another vent consistent with the technology disclosed herein is illustrated. A shutoff vent 200 generally has a main body 202 with a first end 204 and a second end 208. The main body 202 defines a first opening 206 towards the first end 204 and a second opening 210 towards the second end 208. The main body defines a mating port 250 between the first opening 206 and the second opening 210. In an open vent position, the first opening 206 and the second opening 210 are in communication through the mating port 250 to define a gas passageway 234. The gas passageway 234 extends past the translatable plug 238.

The vent 200 has a translatable plug 238 disposed within the main body 202. The plug 238 is configured to reversibly translate towards the second end 208 to sealably obstruct the mating port. The vent 200 has a first gas-permeable substrate 218 disposed around the plug 238. The first gas-permeable substrate 218 is disposed between the first end 204 and the second end 208 of the main body 202.

The vent 200 can have a carrier 230 disposed across the first opening 206. The carrier 230 generally defines a perimeter region 219 further defining a gas passageway 234 between the first and second openings 206 and 210 such that the gas passageway 234 extends past the translatable plug 238. In this embodiment, the first gas-permeable substrate 218 is the carrier 230. The translatable plug 238 is coupled to the first gas-permeable substrate 218/carrier 230. The first gas-permeable substrate 218 can be molded to the plug 238 to form an integral component. The plug 238 can be welded to the first gas-permeable substrate 218, or otherwise adhered using adhesives and the like. Specifically, in embodiments consistent with the current figures, the translatable plug 238 is coupled to a central region 217 central to a perimeter region 219 of the first gas-permeable substrate 218. The first gas-permeable substrate 218 is coupled to the main body 202 and extends across the first opening 206. The plug 238 is thereby suspended by the first gas-permeable substrate 218.

The first gas-permeable substrate 218 generally extends between the plug 238 and the main body 202 of the vent 200. The first gas-permeable substrate 218 and the plug 238 generally form a liquid barrier between the first opening 206 and the second opening 210 of the main body 202. Gas communication between the first and second openings 206 and 210 is accommodated by the first gas-permeable substrate 218, which further defines the gas passageway 234. In some embodiments, the first gas-permeable substrate 218 is substantially liquid impermeable. In some other embodiments, the first gas-permeable substrate 218 provides a structure that substantially resists flow of the liquid that the vent 200 is configured to contain in a reservoir. The first gas-permeable substrate 218 can be constructed of materials consistent with the gas-permeable substrate discussed above with reference to FIGS. 1-5. The first gas-permeable substrate 218 is generally flexible and allows the plug 238 to reversibly translate towards the second end 208 to form a seal with the mating port 250. The first gas-permeable substrate 218 biases the plug 238 of the vent 200 to define a clearance between a mating surface 244 defined by the plug 238 and the mating port 250, further defining the gas passageway 234 to extend past the translatable plug 238.

The flexible carrier, in this case the first gas-permeable substrate 218, allows the plug 238 to reversibly translate towards the second end 208 of the vent 200. At least a portion of the first gas-permeable substrate 218 is configured to deflect towards the second end 208 of the main body 202 when force is applied to it and/or the plug from the first end 204. Sufficient force applied to the first gas-permeable substrate 218 and/or the plug 238 results in translation of the plug 238 to sealably obstruct the mating port 250. Such force can result from hydrostatic pressure or from sloshing liquids, as described above with reference to FIGS. 1-5.

In the current figures, a second gas-permeable substrate 268 is disposed across the second opening 210 towards the second end 208 of the main body 202, although in some embodiments the second gas-permeable substrate 268 will be omitted. The second gas-permeable substrate 268 is generally configured to provide ingress protection from liquid and solid contaminants in the environment outside of the vent 200 to maintain cleanliness and purity within the reservoir and the vent 200. If the liquid reservoir is upset, such contaminants could prevent the plug 238 from sealing with the mating port 250 and inhibit shutoff performance. If contaminants travel through the vent and into the liquid reservoir, downstream components of the relevant system can be harmed (such as fuel delivery systems). The second gas-permeable substrate 268 can be constructed of similar or different materials than the first gas-permeable substrate 218. The functions and material construction of the second gas-permeable substrate 268 are consistent with those of the second gas-permeable substrate described above with reference to FIGS. 1-5.

In the examples shown in FIGS. 6-8, similar to those of FIGS. 1-5, the mating port 250 defines a frustoconical surface that facilitates the forming of a seal between the circular, radially symmetrical shape of the plug mating surface 244 and the mating port 250. The plug 238 can translate towards the mating port 250 in a misaligned manner resulting from uneven forces applied to the plug 238. The frustoconical walls of the mating port 250 can guide the mating surface 244 of the plug 238 into a relatively aligned position to form a seal. The tapered or rounded shape of the mating surface 244 accommodates a seal with the mating port 250 in a slightly misaligned position.

As shown by FIG. 8, the main body 202 defines a lip 211 configured to receive the first substrate 218. The lip 211 has a ring shape in the current embodiment. The first substrate 218 is seated on the lip 211 and in sealable engagement. The first gas-permeable substrate further defines the gas passageway 234 between the first opening 206 and the second opening 210. The vent 200 has a retaining ring 212. The retaining ring 212 is configured to retain the position of the first gas-permeable substrate 218 relative to the main body 202. Unlike the retaining ring of FIGS. 1-5, the retaining ring 212 does not define a plurality of openings. The retaining ring can have a groove 215. The main body 202 can have a ridge 203 configured to interface with the groove 215 of the retaining ring 212. The retaining ring 212 coupled to the main body 202 retains the first gas-permeable substrate 218 in a manner consistent with the retaining ring described above with reference to FIGS. 1-5.

Similar to the above discussion of FIGS. 1-5, the main body 202, the retaining ring 212, the first and second gas-permeable substrates 218 and 268, the plug 238, and any other components that are in communication with the interior of the liquid reservoir are generally constructed of materials that are chemically stable in the presence of the particular liquid in the reservoir.

Figure 9:
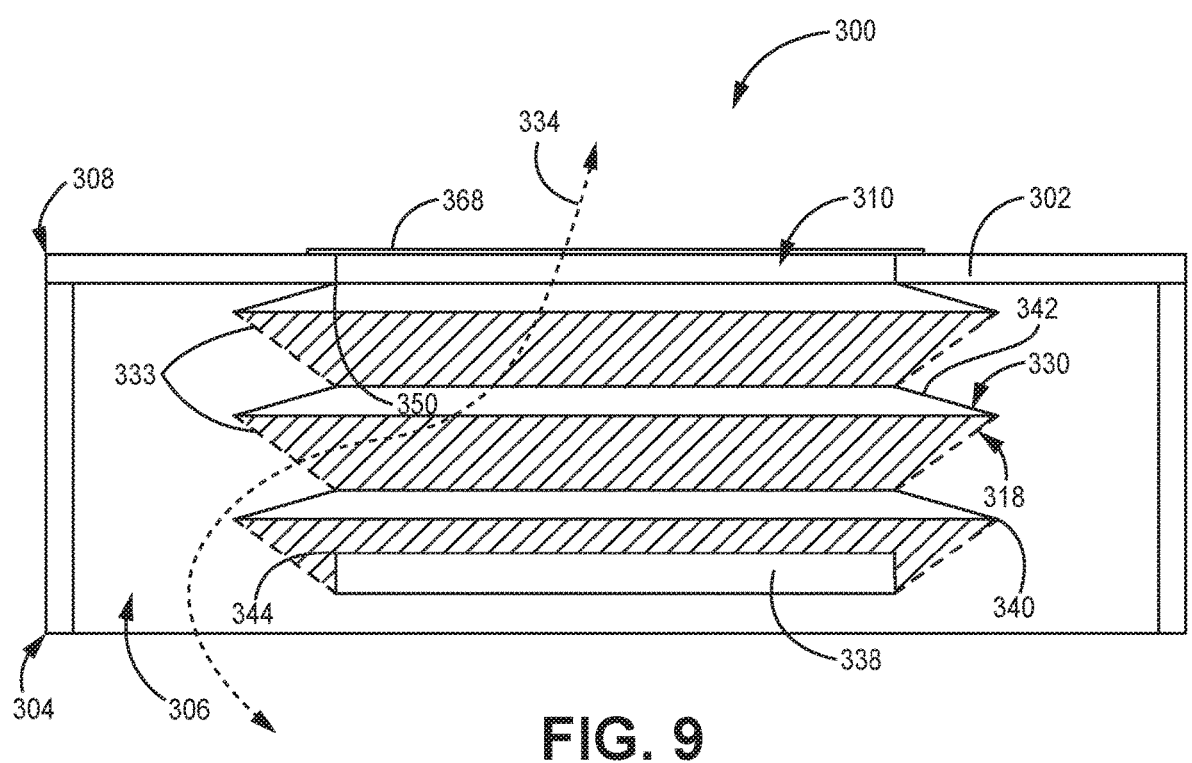
FIG. 9 depicts a side view of another example embodiment consistent with the technology disclosed herein in a first position.
Figure 10:
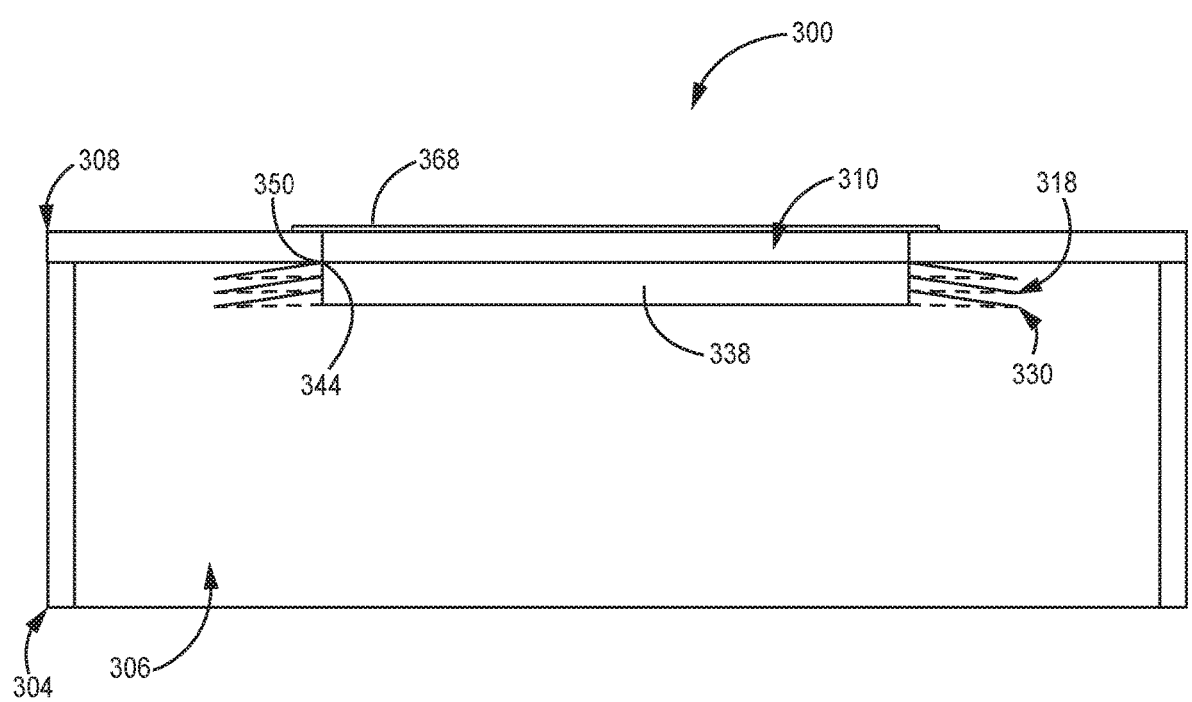
FIG. 10 depicts a side view of the example embodiment of FIG. 9 in a second position.

FIGS. 9 and 10 illustrate yet another shutoff vent consistent with the technology disclosed herein, where FIG. 9 depicts the shutoff vent 300 in a first position and FIG. 10 depicts the shutoff vent 300 in a second position. The shutoff vent 300 generally has a main body 302 with a first end 304 and a second end 308. The main body 302 defines a first opening 306 towards the first end 304 and a second opening 310 towards the second end 308. The main body 302 defines a mating port 350 between the first opening 306 and the second opening 310. In an open vent position, the first opening 306 and the second opening 310 are in fluid communication through the mating port 350 to define a gas passageway 334. The gas passageway 334 extends past the translatable plug 338.

The vent 300 has a translatable plug 338 disposed within the main body 302. The plug 338 is configured to reversibly translate towards the second end 308 when force is applied to the translatable plug 338 from the first end 304. The plug 338 is configured to translate to sealably obstruct the mating port 350. While the plug 338 depicted in FIGS. 9 and 10 has a cylindrical disc shape, in some embodiments the plug 338 can have a tapered shape to accommodate the mating port. In such embodiments, the plug 338 is tapered from the first end 304 to the second end 308. The vent 300 also first gas-permeable substrate 318 disposed around the plug 338. The first gas-permeable substrate 318 is disposed between the first opening 306 and the second opening 310 such that the first gas-permeable substrate 318 further defines the gas passageway 334 between the first opening 306 and the second opening 310.

The first gas-permeable substrate 318 generally extends between the plug 338 and the main body 302 of the vent 300 and is generally configured to allow gas transmission and to substantially inhibit or block liquid flow between the first and second openings 306 and 310. In some embodiments, the first gas-permeable substrate 318 is configured to allow gas transmission and prevent liquid from flowing therethrough when making passive contact with the first gas-permeable substrate 318.

Similar to embodiments described with reference to FIGS. 6-8, in the current embodiment the first gas-permeable substrate 318 can be incorporated into the structure of the carrier 330 such that they are a single cohesive component. The translatable plug 338 is coupled to a carrier 330. In some embodiments, the translatable plug 338 is coupled to a central region of the carrier 330. In some examples, at least some portions of the carrier 330 are substantially liquid and gas impermeable. In such examples, gas-permeable substrate regions 333 of the carrier 330 accommodate gaseous communication between the first and second openings 306 and 310. In some embodiments, the gas-permeable substrate regions 333 are formed by perforations made in the material of the carrier 330. In some embodiments, the gas-permeable substrate regions 333 are regions of membrane disposed across openings in the material of the carrier 330. The gas-permeable substrate regions 333 can be constructed of materials consistent with the gas-permeable substrates discussed above with reference to FIGS. 1-5. Other constructions of the carrier 330 are contemplated. In some embodiments, the carrier 330 is a single component with a uniform material composition. In such embodiments, the entirety of the carrier 330 is the gas-permeable substrate region 333. In some cases, carrier is made of a substantially liquid and gas impermeable material. The carrier 330 can also be coated with a substantially liquid and gas impermeable material at discrete locations to define the gas-permeable substrate regions 333. The carrier 330 can be polymeric. Certain polymeric materials are suitable for use as a carrier because they are characterized by chemical stability in the presence of the liquids that the vent 300 is configured to contain in a reservoir. The carrier 330 can be consistent with the carrier and substrates discussed above with reference to FIGS. 1-5.

Generally, it is desirable that the carrier 330 inhibits liquid flow there-through. The carrier 330 defines a portion of a gas passageway 334 to allow gas to flow between the first end 304 to the second end 308 of the vent 300. The gas passageway 334 is further defined by the plurality of gas-permeable substrate regions 333 of the carrier 330. As such, the gas passageway 334 extends past the translatable plug 338.

The carrier 330 is configured to allow the plug 338 to reversibly translate towards the second end 308. The carrier 330 is configured to deflect towards the second end 308 of the main body 302 when force is applied to the plug 338 from the first end 304. The first opening 306 of the vent 300 is configured to be in fluid communication with the interior of a liquid reservoir. Sufficient force applied to the plug 338 results in translation of the plug 338 to sealably obstruct the mating port 350. Such force can result from hydrostatic pressure or from sloshing liquids, as described above with reference to FIGS. 1-5.

In embodiments consistent with the current figures, the carrier 330 is configured as a bellow mechanism. In some embodiments, a bellow mechanism has a generally zigzag cross section spanning the gap between the main body 302 and the plug 338. In some embodiments, the carrier 330 is substantially cylindrical, with one end of the cylindrical bellow coupled to the main body 302 and the other end connected to the plug 338. The plug 338 is suspended by the bellow and the plug 338 translation is facilitated by the bellow configuration. The bellow configuration contains a plurality of flexible the corners 340 and walls 342. In some examples, the walls 342 are configured to pivot around the corners 340 to reversibly collapse the bellow. The reversible collapsibility of the bellow facilitates the translation of the plug 338.

The plurality of corners 340 and walls 342 of the carrier 330 accommodate the plug 338 as it is translated towards the second end 308. The stiffness of carrier 330 can be tuned by varying the number of corners 340 and the length of the walls 342. For a given thickness of material, the stiffness decreases with the number of corners 340 and with the length of the walls 342. The stiffness can also be tuned by using various materials and thicknesses of materials to construct the carrier 330. The utility of a proper stiffness of the carrier 330 can be consistent with that described above with reference to FIGS. 1-5.

In some examples, a second gas-permeable substrate 368 is disposed across the second opening 310 towards the second end 308 of the main body. Generally, the second opening 310 is configured to be in communication with an environment outside of the fluid reservoir, such as a venting system, the ambient environment, or other examples described above. The second gas-permeable substrate 368 can be coupled to the main body 302 through approaches described above with reference to FIGS. 1-5.

Figure 11:
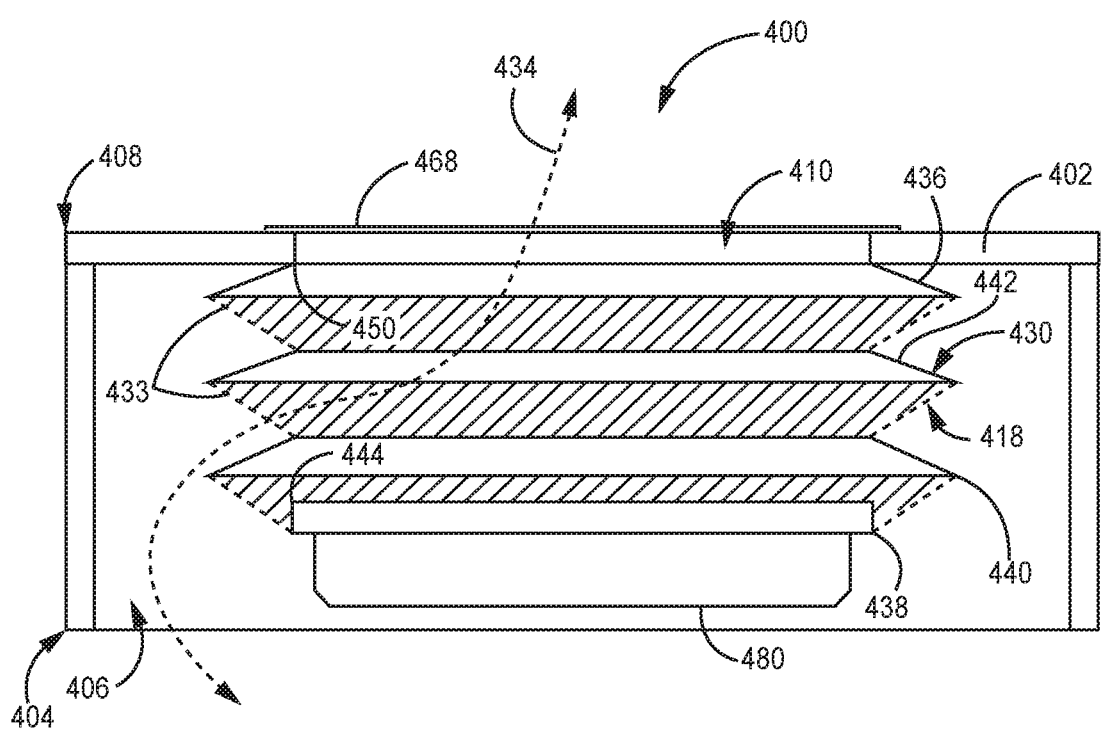
FIG. 11 depicts a side view of another example embodiment consistent with the technology disclosed herein.

FIG. 11 depicts an alternative configuration of an example vent 400. The vent 400 is generally consistent with the vent configuration depicted in FIGS. 9-10. The vent 400 has a main body 402 defining a first end 404 and a second end 408. The main body 402 defines a first opening 406 towards the first end 404 and a second opening 410 towards the second end 408. The main body 402 defines a mating port 450 between the first opening 406 and the second opening 410. Generally, the first opening 406 and the second opening 410 are in communication through the mating port 450 when the vent is in an open position, which defines a gas passageway 434. The gas passageway 434 extends past the translatable plug 438.

Similar to the embodiments of FIGS. 9-10, the current vent 400 has a carrier 430 configured as a bellow mechanism with a plurality of openings 433 defining a gas passageway 434, impermeable regions 436, corners 440, and openings 442. A translatable plug 438 is disposed within the main body 402. The translatable plug 438 is coupled to the carrier 430 in a spaced relationship from the mating port 450. The vent 400 has first and second gas-permeable substrates 418 and 468. The vent 400 is configured to couple to a liquid reservoir with a first opening 406 in communication with the reservoir. The vent 400 is configured to mount to a liquid reservoir in a horizontal orientation, with the first end 404 facing downwards towards the liquid reservoir and the second end 408 facing upwards with respect to gravity.

Elements are configured similarly to similar elements described above with respect to the vent 300 of FIGS. 9-10. Unlike embodiments consistent with FIGS. 9-10, the current example vent 400 has a weight 480 coupled to the plug 438. In some embodiments the weight 480 can be integral with the plug 438, and in some embodiments the weight 480 is a separate component from the plug 438. The weight 480 can enhance the liquid shutoff functionality of the vent 400. In an upset reservoir condition, the force exerted on the plug 438 by the weight 480 and the reservoir fluid entering the vent 400 through the first opening 406 translates the plug 438 in a direction towards the second end 408 to close and seal the mating port 450. In some embodiments a mechanical or magnetic mechanism can be incorporated between the plug 438 and the mating port 450 or the main body 402 to enhance the seal between the plug 438 and the mating port 450.

Figure 12:
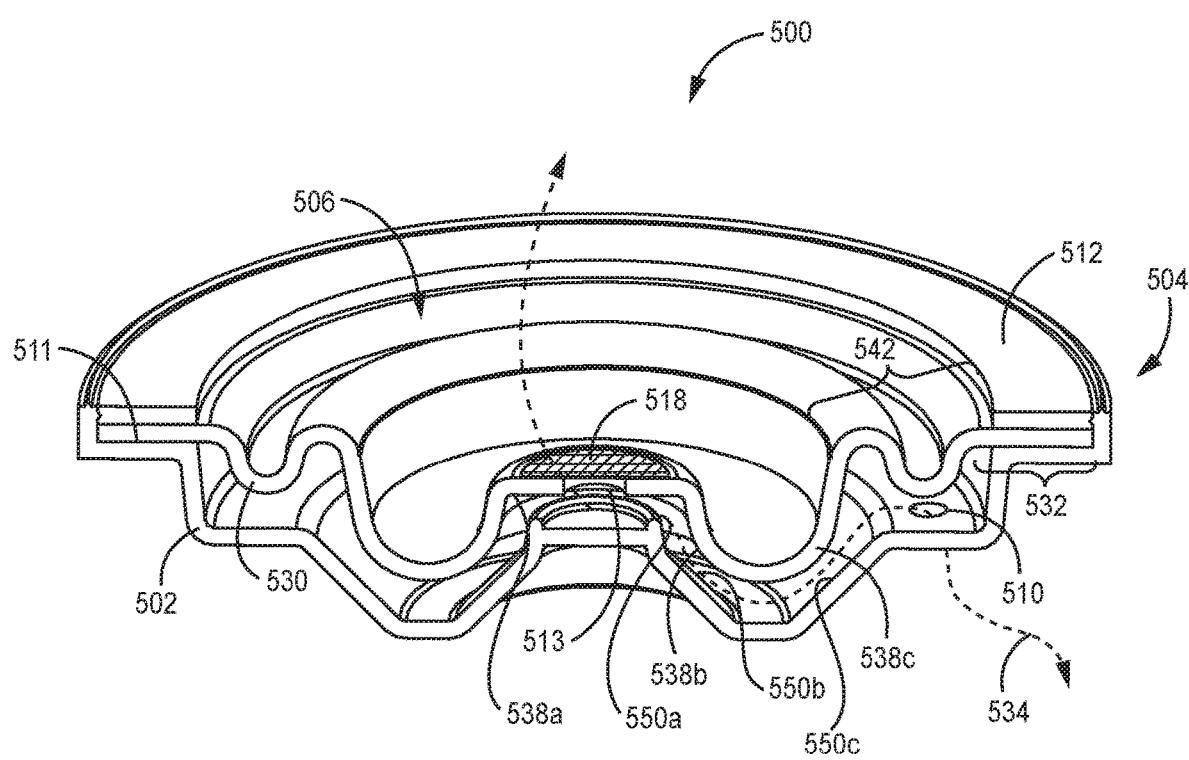
FIG. 12 depicts a cross-sectional perspective view of the example shutoff vent of FIG. 12.
Figure 13:
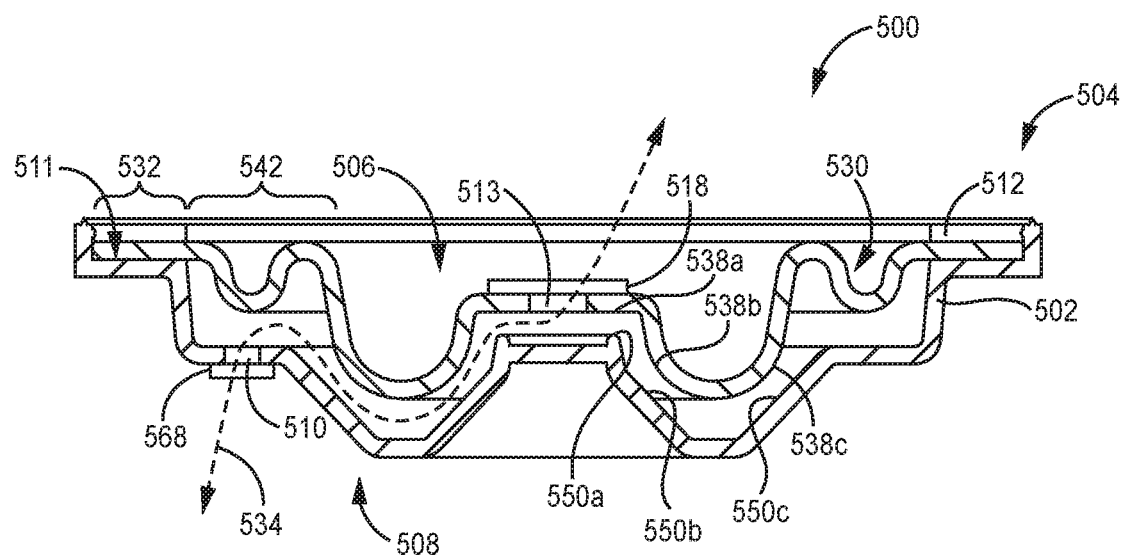
FIG. 13 depicts a cross-sectional view of the example shutoff vent of FIGS. 12 and 13.

FIGS. 12-13 depict another example consistent with embodiments of the technology disclosed herein. Components now described can be constructed of similar materials already described herein with reference to previous examples. The vent 500 has a main body 502 defining a first opening 506 and a second opening 510. The first opening 506 is defined towards a first end 504 of the main body 502 and the second opening 510 is defined towards a second end 508 of the main body 502. A mating port 550a, 550b, 550c is between the first opening 506 and the second opening 510 and the first opening 506 and the second opening 510 are in communication through the mating port 550a, 550b, 550c to define a gas passageway 534. A translatable plug 538a, 538b, 538c is disposed within the main body 502. The translatable plug 538a, 538b, 538c is configured to reversibly translate towards the second end 508 to sealably obstruct the mating port 550a, 550b, 550c.

In contrast with some other examples already disclosed, in the current example, the gas passageway 534 is defined by an opening 513 that is defined by the translatable plug 538a, 538b, 538c. As such, the gas passageway 534 extends past the translatable plug 538 by passing through the translatable plug 538. The first gas-permeable substrate 518 is disposed across the opening 513 defined by the plug 538a, 538b, 538c rather than adjacent the first opening 506. In further contrast with some previous examples, in the current example, the second opening 510 is defined by a plurality of openings that are defined by the main body 502. Rather than a second opening central to the main body as disclosed in previous examples, the plurality of openings defining the second opening 510 are outside the central region of the main body 502. A second gas-permeable substrate 568 can be coupled to each of the openings defining the second opening 510.

The translatable plug 538a, 538b, 538c can be defined by one or more structures that are configured to form a seal with the main body 502 to obstruct the gas passageway 534 when force is applied to the plug 538a, 538b, 538c from the first end 504. Similarly, the mating port 550a, 550b, 550c is defined by one or more structures of the main body 502 that are configured to form a seal with a mating region of the translatable plug 538a, 538b, 538c to obstruct the gas passageway 534. In the current example, there can be multiple regions of the translatable plug 538a, 538b, 538c and the mating port 550a, 550b, 550c that can be configured to sealably obstruct the gas passageway 534, or there can be a single region of the translatable plug 538a, 538b, 538c and the mating port 550a, 550b, 550c that can be configured to sealably obstruct the gas passageway 534.

The translatable plug 538a, 538b, 538c is coupled to a carrier 530. The carrier is coupled to the main body 502 and biases the translatable plug 538a, 538b, 538c in a spaced relationship with the mating port 550a, 550b, 550c. The carrier 530 is configured to deflect towards the second end 508 when force is applied to the plug 538a, 538b, 538c from the first end 504, thereby translating the plug 538a, 538b, 538c to obstruct the mating port 550a, 550b, 550c. The 530 carrier has a perimeter region 532 and a diaphragm spider region 542. The perimeter region 532 is coupled to the main body 502, more particularly sandwiched between a lip 511 defined by the main body 502 and a retaining ring 512, which can couple similarly to similar components described in previous examples. It is noted that, while radial support ribs (described and shown with reference to FIG. 3) are not currently depicted, a similar structure could be incorporated in embodiments otherwise consistent with FIGS. 12-13. The diaphragm spider region 542 is configured to accommodate translation of the plug 538a, 538b, 538c.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as "arranged", "arranged and configured", "constructed and arranged", "constructed", "manufactured and arranged", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

What is claimed is:

1. A shutoff vent comprising:
   a main body comprising a first end and a second end, wherein the main body defines a first opening towards the first end and a second opening defined towards the second end and a mating port between the first opening and the second opening, wherein the first opening and the second opening are in fluid communication through the mating port to define a gas passageway;
   a translatable plug disposed within the main body, wherein the translatable plug is configured to translate towards the second end when force is applied to the translatable plug from the first end, thereby sealably obstructing the mating port;
   an elastomeric carrier integral with the translatable plug, wherein the carrier is coupled to the main body and biases the translatable plug in a spaced relationship with the mating port, the carrier having a perimeter region having carrier openings defining a portion of the gas passageway, wherein the translatable plug is central to the perimeter region; and
   a first gas permeable substrate comprising a membrane disposed across the carrier openings, wherein the membrane is disposed around the plug.

2. The shutoff vent of claim 1, further comprising a second gas-permeable substrate disposed across the second opening.

3. The shutoff vent of claim 1, wherein the translatable plug is coupled to the first gas-permeable substrate.

4. The shutoff vent of claim 1, wherein the gas passageway is further defined by an opening defined by the translatable plug.

5. The shutoff vent of claim 1, wherein the carrier is configured to deflect towards the second end when force is applied to the carrier from the first end, thereby translating the translatable plug to obstruct the mating port.

6. The shutoff vent of claim 1, wherein the carrier comprises a diaphragm spider region, the diaphragm spider region configured to accommodate translation of the translatable plug.

7. The shutoff vent of claim 1, wherein the carrier comprises a substantially liquid and gas impermeable material.

8. The shutoff vent of claim 1, wherein the carrier comprises rubber.

9. The shutoff vent of claim 1, wherein the carrier comprises a thermoplastic elastomer.

10. The shutoff vent of claim 1, wherein the carrier is oleophobic.

11. The shutoff vent of claim 1, wherein the carrier is disposed across the first opening.

12. The shutoff vent of claim 1, wherein the first end defines a coupling structure configured to be coupled to a liquid fuel reservoir.

13. The shutoff vent of claim 1, wherein the mating port is substantially frustoconical.

14. The shutoff vent of claim 1, wherein the first gas-permeable substrate comprises expanded polytetrafluoroethylene (ePTFE).

* * * * *